Patented Mar. 3, 1942

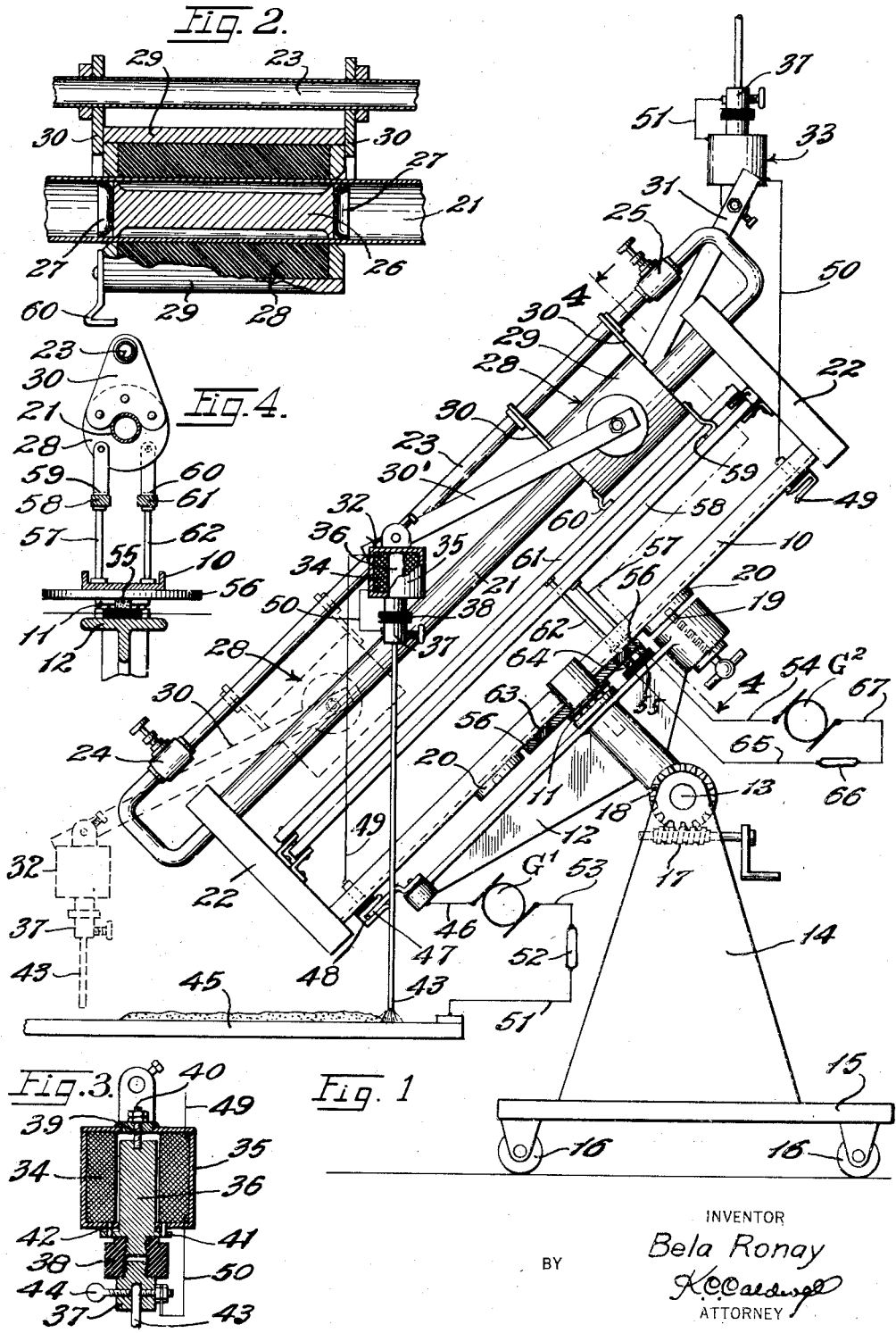

2,274,742

UNITED STATES PATENT OFFICE 2,274,742

WELDING APPARATUS

Bela Ronay, Annapolis, Md.

Application May 10, 1941, Serial No. 392,885

2 Claims. (Cl. 219—8)

(Granted under the act of March 3, 1883, as amended April 30, 1928; 370 O. G. 757)

This invention relates to welding apparatus and it has a particular relation to apparatus designed to weld relatively long seams such as are encountered in the manufacture of pipes and in the fabrication of boiler drums and other large plate assemblies.

At the present development of the art of arc welding, covered or shielded arc welding electrodes are available which yield a deposit of such physical properties that in most joints the filler metal is superior to the base metal parts it unites. The quality of the filler metal when high grade electrodes are used is primarily a function of the consistent performance of the welder. In realization of the undue influence of the human factor, automatic equipment has been developed which uses continuous length electrodes. Such equipment is useful for the fabrication of large structures, such as boiler drums and the like.

The welding of high pressure piping requires as high grade of workmanship as that practiced in connection with the construction of large pressure vessels. However, the use of fully automatic welding apparatus employing continuous electrodes is not applicable for welding pipe joints partly because the rapid deposition of the weld metal builds up an excessively high temperature at the weld zone, resulting in the development of grain growth at the weld boundaries, and partly because the time required in removing the slag on the completion of each pass remains about the same as in manual welding. The use of high cost automatic apparatus of the type now available is, therefore, not justified.

The successful deposition of a welding electrode upon a flat surface, regardless of the plane or location thereof, requires the development of a movement which is the resultant of two components; namely, feeding the electrode toward the target or work to compensate for its consumption, and advancing it along the joint at a uniform rate. The resultant path of these components is the hypotenuse of a right triangle whose height is the electrode length and its base is the length of the increment. In order to obtain a proper weld it is necessary for a skilled welder to guide the electrode along this imaginary hypotenuse and at the same time, maintain the arc length within a very close tolerance in order to obtain a sound and uniform deposit. In pipe welding, a third component must also be considered; namely, the constantly-changing angle of inclination between the electrode and the target. The presence of this component increases the difficulty of maintaining the arc length within the very restricted limitations so that of the many welders who are considered capable and qualified to produce sound welds uniting flat surfaces, few can qualify to weld high pressure piping without special training.

The principal object of the present invention is the provision of an automatic welding apparatus by means of which the difficulties and uncertainties above referred to are avoided and which is designed primarily for use in pipe welding, although it is equally applicable to a large variety of structures.

Another object of the invention is to provide a welding apparatus whereby the uniform deposition of high grade electrodes ceases to be a performance requiring highly skilled manipulation and whereby successive increments may be deposited with desired uniformity without particular skill or handling.

A further object of the invention is the provision of a welding apparatus which embodies in its construction a hydraulically controlled gravity feed for the welding electrodes whereby inequalities and lack of uniformity in welds, due to the human factor, are greatly reduced.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing, means for carrying the invention into practical use, without limiting the improvements in their useful application to the particular constructions, which, for the purpose of explanation, have been made the subject of illustration.

In the accompanying drawing:

Fig. 1 is a digrammatic side elevational view of a welding apparatus constructed in accordance with the invention, certain parts being shown out of position for the sake of clearness;

Fig. 2 is an enlarged longitudinal sectional view of the magnetically coupled hydraulically controlled electrode feeding mechanism;

Fig. 3 is an enlarged vertical sectional view through one of the pick-up solenoids, and Fig. 4 is a transverse sectional view taken on line 4—4 of Fig. 1.

Referring to the drawing, a welding device embodying the present invention is shown as comprising an inclined support or cradle 10 which is pivotally mounted intermediate its ends for swinging movement about an inclined axis on a bearing 11 carried by a bracket 12. The bracket 12 is journalled on a horizontal stub shaft 13 mounted at the upper end of a pedestal 14 supported by a base 15 provided with wheels or rollers 16 to permit of the easy movement of the entire assembly carried thereby along a structure being welded. The inclination of the cradle 10 may be adjusted as desired by means of a worm 17 journalled in the pedestal 14 for engagement with a worm wheel 18 fixed to the bracket 12, and the location of the cradle 10, when swung in its bearing 11, may be fixed by a spring detent 19 mounted in the bracket 12 for engagement with sockets 20 provided on the cradle 10.

A fluid pressure cylinder 21, of brass or other nonmagnetizable material, is carried by uprights 22 mounted on the cradle 10 and its ends are connected to form a closed hydraulic circuit by means of a pipe 23. The intermediate portion of the pipe 23 lies above and parallel to the cylinder 21 and is provided with valves 24 and 25 adjacent its ends for controlling the rate of flow of fluid through the system. A piston 26 (Fig. 2) of iron or other magnetizable metal is mounted for reciprocation within the cylinder 21 and is provided at its ends with liquid sealing cups 27. A carriage in the form of a solenoid 28 surrounds the cylinder 21 and is magnetically coupled with the piston 26 for movement in unison therewith. The armor or casing 29 of the solenoid 28 is provided with brackets 30 for slidable engagement with the pipe 23 which acts as a guide during the movement of the solenoid along the cylinder 21 and prevents any turning movement on the cylinder, as will presently be described.

Mounted one on each side of the casing 29 of the solenoid 28 for rotary and lateral adjustment and extending in opposite directions from one another are two arms 30' and 31 to the outer ends of which pick-up or starting solenoids 32 and 33 are adjustably secured. Each of these solenoids comprises a winding 34 housed within a casing 35 and having an armature 36 mounted for vertical reciprocation therein. The lower end of the armature 36 extends through the casing 35 and is secured to an electrode holder 37 in spaced relation thereto by means of a collar 38 of insulating material. The armature 36 is suspended in the solenoid for a limited amount of vertical play by means of a screw 39 which extends through the upper end of the casing 35 and has lock nuts 40 threaded thereon. The lower end of the armature 36 is formed with a collar 41 through which a pair of guiding pins 42 carried by the casing 35 extends. The electrode holder 37 has a welding electrode 43 secured therein by a thumb screw 44. The solenoids 32 and 33 are adjustable on the arms 30 and 31 so as to permit the welding electrode 43 to be positioned at the proper working angle with respect to a target 45 which may be a circular pipe joint or a longitudinal seam, as shown.

The welding electrodes are at times supplied with electric current which traverses a circuit from a generator $G^1$, thence through wire 46, switch element 47 carried by the bracket 12 but insulated therefrom, lowermost switch element 48 carried by the cradle 10 and insulated therefrom, wire 49, winding 34 of the lowermost starting solenoid 32, wire 50, electrode holder 37, welding electrode 43, target 45 and wire 51, starting switch 52 and wire 53 back to the generator $G^1$. The energizing of the winding 34 elevates the armature 36 a sufficient distance to strike the welding arc. As soon as the welding arc is established the apparatus is moved manually along the target depositing the fused welding electrode thereon which is fed downwardly in the manner now to be described.

Simultaneously with the closing of the welding circuit just described or a little in advance thereof, the solenoid 28 is energized by electric current from a generator $G^2$ which traverses a circuit including wire 54, stationary brush 55 carried by the bracket 12, outer collector ring 56 carried by the rotatable cradle, conductor 57, rail 58, contact shoe 59, solenoid 28, contact shoe 60, rail 61, conductor 62, inner collector ring 63 carried by the cradle concentric with the collector ring 56 and insulated therefrom, brush 64, wire 65, switch 66 and wire 67 back to generator $G^2$. The energizing of the solenoid 28 magnetically couples it with the piston 26 so that it will travel in unison therewith. The valves 24 and 25 in the pipe 23 are also opened an amount sufficient to permit the fluid in the cylinder 21 on the lower side of the piston 26 to escape through the pipe 23 to the upper side of the piston at a rate calculated to control the downward movement of the carriage and parts carried thereby under the action of gravity at a rate proportionate with the rate of consumption of the welding electrode.

In the case of a line weld the carriage and welding apparatus carried thereby are simultaneously moved along the work at the proper rate to insure a uniform deposition of welding metal. In the case of pipe joints the apparatus is maintained stationary and the pipe is rotated at the proper rate. When the solenoid 28 reaches the lower end of the cylinder, as shown by broken lines in Fig. 1, and the electrode 43 is consumed to within a stub length of the holder 37, the operator opens the welding circuit, removes the stub electrode, opens the lower throttle valve 24 fully, closes the upper throttle valve 25 and rotates the cradle 10 and welding instrumentalities 180°. This reverses the position of the electrode holders 37 and brings the solenoid 28 and piston 26 again to the upper end of the cylinder 21 and the new electrode to operative position above the target 45 where it is adjusted with respect thereto and the process is repeated.

The lowermost or welding electrode is so adjusted that it will be in the plane of the target and its inclination such as may be required for the type of work being performed and such as will permit the deposition of the fused portion of the lower electrode within the required incremental length of the electrode. This is accomplished by adjusting the inclination of the cradle 10, that of the arms 30 and 31 and the angular and lateral positions of the starting solenoids 32 and 33 on said arms. The electrodes being thus both properly adjusted, the operator from here on has no duty other than the manual movement of the carriage and the replenishment of the electrodes when they are consumed. At the beginning of each welding operation the succeeding weld is made to overlap the preceding one thus remelting it and eliminating the objection of interrupted welding.

It will be understood that the above description and accompanying drawing comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

Having thus set forth and disclosed the nature of this invention, what is claimed is:

1. A welding apparatus comprising a base mounted for movement along a line being welded; a support mounted on said base for adjustment to an angle with the horizontal; a cradle mounted on said support for rotation about a pivot located intermediate its ends; a carriage mounted on said cradle for movement longitudinally thereof; an electrode holder mounted on said carriage at each end thereof, said carriage being movable downwardly along said cradle under the influence of gravity to feed an electrode in the lowermost holder toward the structure being welded; and means for adjusting the rate of downward movement of said carriage along said cradle to correspond to the rate of consumption of said electrode, said cradle being rotatable about said pivot to reverse the position of said holders and move a fresh electrode in the uppermost holder into welding position when the first mentioned electrode is consumed to in turn descend toward said structure.

2. A welding apparatus comprising a base mounted for movement along a line being welded; a support mounted on said base for adjustment to an angle with the horizontal; a cradle mounted on said support for rotation about a pivot located intermediate its ends; a carriage mounted on said cradle for movement longitudinally thereof; an electrode holder mounted on said carriage at each end thereof; said carriage being movable downwardly along said cradle under the influence of gravity to feed an electrode in the lowermost holder toward the structure being welded; and fluid escapement means for adjusting the rate of downward movement of said carriage along said cradle to correspond to the rate of consumption of said electrode, said cradle being rotatable about said pivot to reverse the position of said holders and move a fresh electrode in the uppermost holder into welding position when the first mentioned electrode is consumed to in turn descend toward said structure.

BELA RONAY.